United States Patent [19]
Zakhary

[11] Patent Number: 5,554,296
[45] Date of Patent: Sep. 10, 1996

[54] SYSTEM AND METHOD FOR PURIFYING WASTE STREAMS CONTAINING WATER REDUCIBLE PAINTS

[75] Inventor: Nashat Zakhary, Hasbrouck Heights, N.J.

[73] Assignee: Crown Cork & Seal Company, Inc., Philadelphia, Pa.

[21] Appl. No.: 441,022

[22] Filed: May 15, 1995

[51] Int. Cl.$^6$ .................................................. C02F 1/52
[52] U.S. Cl. .......................... 210/702; 210/724; 210/743; 210/930; 427/353
[58] Field of Search .................................. 210/702, 724, 210/743, 930; 427/353

[56] References Cited

U.S. PATENT DOCUMENTS

| | | | |
|---|---|---|---|
| 4,522,962 | 6/1985 | Abbey et al. | 523/410 |
| 4,576,695 | 3/1986 | Owens | 204/181.4 |
| 4,771,088 | 9/1988 | Pekarik | 523/456 |
| 4,853,422 | 8/1989 | Hahn | 523/310 |
| 5,076,939 | 12/1991 | Hunter et al. | 210/724 |
| 5,141,784 | 8/1992 | Beane et al. | 427/419 |
| 5,201,436 | 4/1993 | Owens et al. | 220/458 |
| 5,259,976 | 11/1993 | Bui et al. | 210/724 |
| 5,326,808 | 7/1994 | Floyd et al. | 524/457 |

*Primary Examiner*—Neil McCarthy
*Attorney, Agent, or Firm*—Woodcock Washburn Kurtz Mackiewicz & Norris

[57] ABSTRACT

Methods for purifying aqueous waste streams containing a water reducible paint composition and equipment systems capable of conducting such methods are provided. In general terms the methods can be practiced by first providing an aqueous waste stream comprising a minor amount of a water reducible paint composition. This aqueous waste stream will commonly have a water content of at least 95 percent by weight. An acid, preferably sulfuric acid, is then admixed with the aqueous waste stream to form a suspension comprising water and precipitated paint compounds. Following the precipitation step a portion of the precipitated paint compounds are separated from the water.

20 Claims, 2 Drawing Sheets

SYSTEM AND METHOD FOR PURIFYING WASTE STREAMS CONTAINING WATER REDUCIBLE PAINTS

FIELD OF THE INVENTION

The present invention relates to the purification of aqueous waste streams containing a minor amount of a water reducible paint material. The present invention is particularly advantageous in treating wash coat solutions formed in the metal can industry.

BACKGROUND OF THE INVENTION

The purification of various waste streams produced in industry is generally regulated by either federal, state, or local agencies. In many instances regulation is not required for existing processes, but may be required for new or altered processes. In some instances, the development of successful waste treatment methods associated with pollution sources leads to the promulgation of new regulations for those existing processes.

Currently, federal standards have not been set with respect to waste streams generated from the use of water reducible paints in industrial settings. These paints are commonly applied to various surfaces for various reasons with the resultant production of a waste stream resulting generally from excess and run-off paint. This waste stream is commonly diluted with water and disposed of by directing it to the municipal water waste treatment facility.

Previous attempts to treat waste streams containing a relatively minor concentration of a water-reducible paint material have included ultrafiltration processes. However, such processes have had only marginal success. Drawbacks include the difficulty in handling large volumes of waste water and the concomitant expense associated with such processing. Evaporative techniques are also not feasible due to the large volume of water in these waste streams.

A need therefore exists to develop a simple, efficient processing technique of handling waste water streams containing a relatively minor concentration of water-reducible paint materials.

SUMMARY OF THE INVENTION

The present invention provides methods for purifying aqueous waste streams containing a water reducible paint composition and for equipment systems capable of conducting such methods.

In general terms the method can be practiced by first providing an aqueous waste stream comprising a minor amount of a water reducible paint composition. This aqueous waste stream will commonly have a water content of at least 95 percent by weight. An acid is then admixed with the aqueous waste stream to form a suspension comprising water and precipitated paint compounds. The precipitated paint compounds are formed from the organic portions of the paint composition. Following the precipitation step a portion of the precipitated paint compounds are separated from the water.

The preferred acid for use in the processing is sulfuric acid, either in its concentrated or diluted form. It is preferred to use the sulfuric acid in the form of a concentrated solution, such as a 96–98 percent by weight solution.

The pH of the suspension formed from the admixture of the waste stream with the acid is preferably maintained below about 5.5, preferably below about 5, and more preferably below about 4.5 to ensure substantial precipitation. In a preferred embodiment the pH of the suspension is monitored, either periodically or continuously, to adjust the processing parameters to maintain the pH at a proper level. In response to the pH monitoring, the rates of addition of the waste stream, the acid, and optionally an aqueous stream, can be adjusted by an operator or through a central control system.

The present invention provides for a purification system for conducting the inventive methods. Generally, the system will comprise a treatment tank for accepting the aqueous waste stream, a pH probe positioned to monitor the pH of a liquid contained within the treatment tank, a waste water flow line in fluid communication with the treatment tank for transporting the aqueous waste stream to the treatment tank, and an acid flow line in fluid communication with the treatment tank for transporting acid to the treatment tank. The acid, preferably sulfuric acid, contacts the aqueous waste stream to precipitate a portion of the water reducible paint composition. A control means, connected to the pH probe, is also incorporated for adjusting the pH of the liquid contained within the treatment tank in response to the monitoring by the pH probe.

DETAILED DESCRIPTION OF THE INVENTION

The present invention provides for methods for purifying aqueous-based waste streams that contain a low concentration of a water reducible paint composition. The purification process entails separating a portion of the organic compounds that partially constitute the paint composition from the aqueous waste stream. The purification process generally requires contacting the waste stream with an acidic solution, preferably a sulfuric acid solution, in an amount sufficient, and for a period of time sufficient, to cause a portion of the organic paint compounds to precipitate from the waste stream solution. The thus precipitated paint compounds are then separated from the waste stream by conventional techniques. The present invention also provides for a processing system capable of carrying out the inventive methods.

The principles of the present invention can be practiced in any of the various industrial settings where an aqueous-based waste stream is produced containing a minor amount of a water reducible paint composition. A typical example of such an industrial setting is in the food and beverage industry where metal cans are being processed for use as containers. These metal cans are commonly treated with a paint composition to inhibit the attack of corrosion and/or rust.

Figure 1:
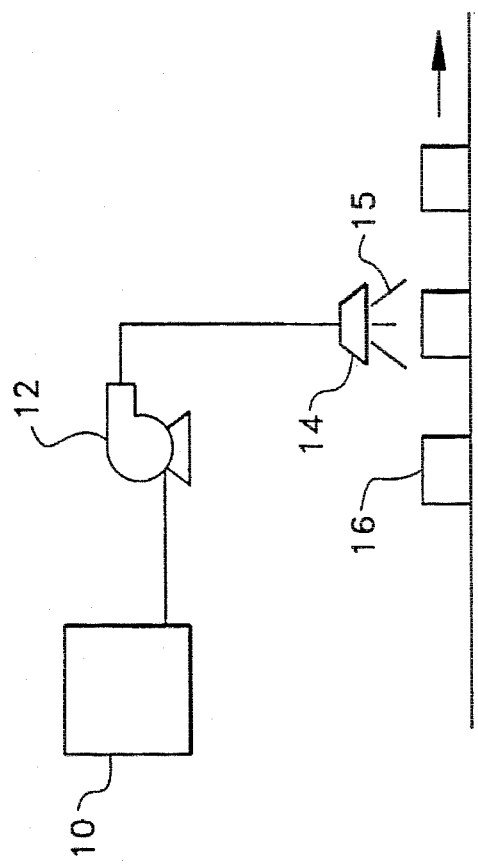
FIG. 1 is a depiction of an industrial operation wherein a paint composition is applied to an article.

Although the present invention can be conducted in any of a number of industrial settings, the detailed embodiments of the present invention will be discussed in connection with one embodiment for simplification. A general processing scheme for the treatment of metal cans with such a protective paint coating as noted above is set forth in FIGS. 1–3. As shown in FIG. 1 the metal cans 16 to be treated are maneuvered in such a way that they can be coated with the paint composition. In this example, the metal cans 16 are transported with the bottom of the metal can 16 facing an applicator 14. The metal cans 16 are contacted with a wash coat paint solution 15 that is maintained in tank 10 and transferred to the applicator 14 by means of pump 12.

The wash coat paint solution typically contains a wash coat paint diluted with water. The wash coat paint can be selected from any of the known paints useful for such purposes that contain organic paint compounds in an water carrier. Typically, the wash coat paint is an aqueous-based modified epoxy paint composition. Such wash coat paints typically include epoxy acrylic copolymer paints. The epoxy acrylic paints contain an epoxy resin copolymerized with an acrylic monomer. The paint is nuetralized with such compounds as amines and carboxylic acids to nuetralize the paint so that it is water reducible, or water dispersible. Reference is made to U.S. Pat. Nos. 5,201,436 and 5,141,784, both of which are incorporated herein in their entirities by reference, for general descriptions of such paints. The wash coat paint is an aqueous-based paint and generally contains at least about 40, and typically from about 40–70, commonly from about 45–65, weight percent water. The wash coat paint generally contains from about 10–40, preferably from about 15–35, weight percent of the epoxy acrylic polymer and the remainder of the paint composition is constituted by organic solvents such as alcohols, e.g. ethanol and butanol, melamine resins, and surfactants. Commercial examples of useful wash coat paints are the 640C series, such as 640C-653 and 640C-669 from The Glidden Company, the 10W21 paint from BASF, and the 94XW020 paint from Valespar.

The wash coat paint solution is applied to the metal cans 16 by means of applicator 14 in an amount sufficient to provide a substantially, preferably complete, homogeneous coating on the outside surface of the metal can 16. However, during this application process excess paint material can form near the cut edge 18 of the metal can 16. It is desirable to remove this excess paint material.

Figure 2:
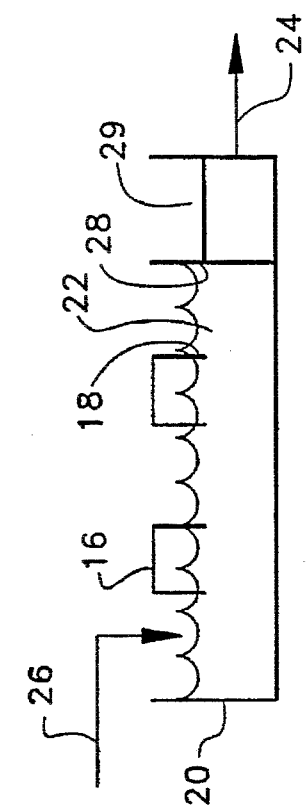
FIG. 2 is a depiction of an industrial operation wherein excess paint composition is removed from an article thus producing a waste stream that can be purified in accordance with the methods and systems of the present invention.

FIG. 2 depicts a common processing technique useful for the removal of the excess paint material near the cut edge 18 of the metal can 16. The metal cans 16 are dipped into a wash solution 22 held within a rim dip tank 20. The excess paint material formed near the cut edge 18 of the metal cans 16 is thereby removed and transferred into the wash solution 22. The wash solution 22 is comprised primarily of water, although various solvents for the wash coat paint may be used in conjunction with water. The wash coat paint material is thereby diluted in the wash solution. Typically, the water content of the wash solution 22 is at least 95 percent by weight, preferably at least 98 percent by weight, and more preferably at least 99 percent by weight. The wash solution 22 contains the organic portions of the wash coat paint materials in an amount of less than 5 percent by weight, preferably less than 2 percent by weight, and more preferably less than 1 percent by weight.

The cleaning operation conducted within rim dip tank 20 is generally conducted in a continuous fashion. As such, fresh aqueous cleaning solvents, typically water such as municipal water, are continuously or periodically added into rim dip tank 20 as shown by line 26 in FIG. 2. The wash solution 22 can be continuously or periodically removed from cleaning tank 20 via line 24. In this embodiment, an overflow processing scheme is employed whereby the wash solution 22 is allowed to flow over wall 28 into a receiving area 29 prior to transport via line 24.

Figure 3:
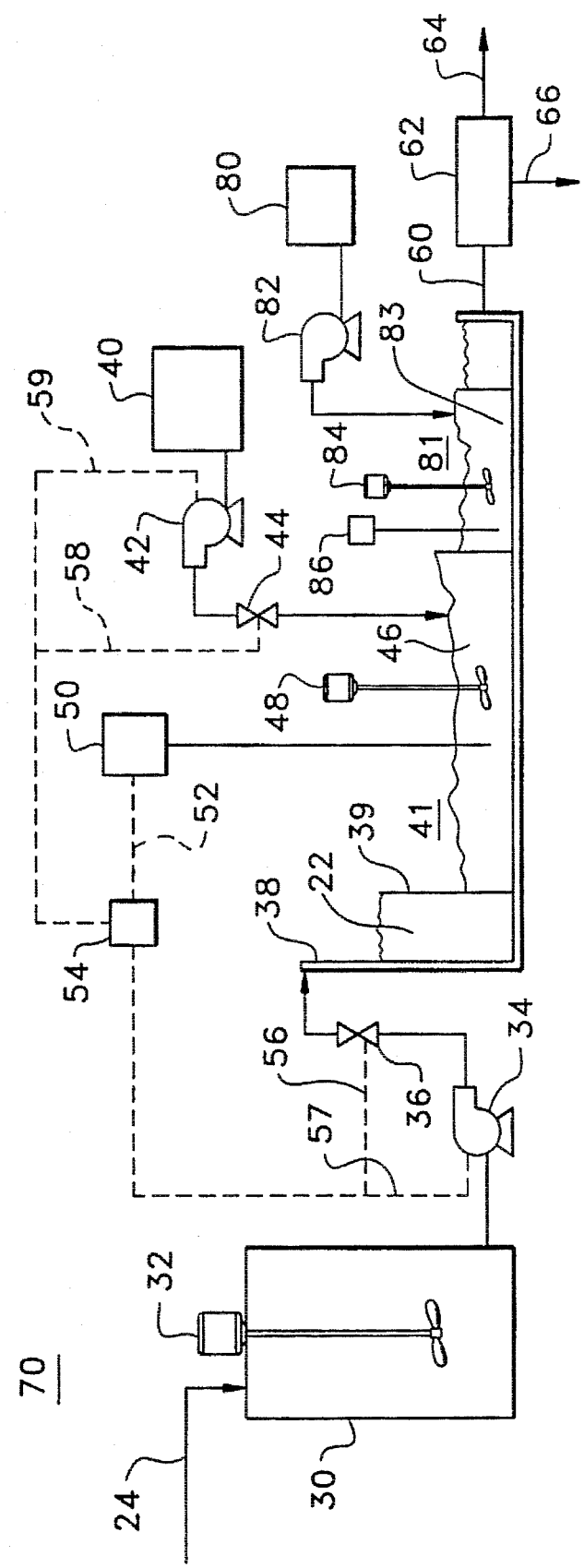
FIG. 3 is a depiction of one embodiment of the process and system of the present invention wherein a waste stream is purified in accordance with the teachings of the present invention.

The wash solution 22 removed from the rim dip tank 20 via line 24 is then transferred to a purification system 70 as shown in FIG. 3. The wash solution can be held in a holding tank 30, preferably equipped with an agitator 32. The wash solution is then transported to a treatment tank 38 via pump 34 and through valve 36. In one embodiment the treatment tank 38 is constructed such that the wash solution 22 is fed into the treatment tank 38 in an upward flow pattern until its level rises past a flow weir 39. The wash solution 22 then flows downward into a treatment area 41 of treatment tank 38. Within this treatment area 41 the wash solution 22 is contacted with an acid, preferably in the form of a solution, to form a treated solution 46. The acidic solution causes a portion of the organic paint components that comprised the original wash coat paint to precipitate from solution. The treated solution 46 is well stirred by agitator 48 to maintain a suspension of the precipitated organic paint components in the aqueous-based treated solution 46.

The acid that can be used to purify the wash coat solution 22 is preferably sulfuric acid. However, various other equivalent acting acids known to those of skill in the art, such as, for example, HCl and nitric acid, can be used although sulfuric acid provides both economical and ecological benefits in comparison to other acid materials. The acid can be admixed into the treated solution 46 in any form, however their concentrated liquid forms are preferable from a processing standpoint in certain instances. Thus, a solution of at least about 95% wt. acid can be used. The acid is stored in tank 40 and transferred to the treatment area 41 by means of pump 42 through valve 44. The acid can also be used in any of its diluted aqueous forms, such that, for example acid solutions of from about 1–94% wt., such as sulfuric acid, can also be used.

The pH of the treatment solution 46 is preferably maintained below a minimum value to optimize the purification process and to improve the down-stream separation processing. The pH of the treatment solution is preferably maintained below about 5.5, preferably below about 5, and more preferably below about 4.5. At these pH levels, the efficiency of the purification process is greatly improved as determined by the relative amount of the organic compounds in the wash coat paint that are precipitated from the cleaning solution. The pH of the wash solution 22 is typically greater than about 6, typically greater than about 7 prior to its treatment.

The pH of the treatment solution can be controlled by various means. One preferred embodiment is as shown in FIG. 3 where a pH probe 50 is positioned such that it can monitor, periodically or continuously, the pH level of the treatment solution 46. The information from the pH probe 50 can be utilized to adjust the flow rates of the incoming streams into treatment tank 38. This adjustment process can be conducted manually by an operator, however it is preferred to employ a control system 54, connected to pH probe 50 by line 52, to assist in this adjustment process.

The control system 54 can be electronically connected to the pump 34 via line 57, to the valve 36 via line 56, to the pump 42 via line 59, or to the valve 44 via line 58. If the pH reading from probe 50 is too high, then the control system 54 can either cause the flow rate of the wash solution from tank 30 to be decreased by means of pump 34 or valve 36, or the control system 54 can cause the flow rate of the sulfuric acid solution contained within tank 40 to be increased by means of pump 42 or valve 44. If the pH reading from probe 50 is too low, and correction is desired, then the control system 54 can either cause the flow rate of the wash solution from tank 30 to be increased by means of pump 34 or valve 36, or the control system 54 can cause the flow rate of the sulfuric acid solution contained within tank 40 to be decreased by means of pump 42 or valve 44. In this latter situation, the control system 54 could also be connected to a water supply (not shown) to cause water to be added into the treatment area 41 to raise the pH of the treatment solution 46. The pumps 34, 42 used to feed the wash solution from tank 30 and the sulfuric acid solution from tank 40 are preferably variable speed pumps.

The efficiency of the purification process can be monitored visually. The wash solution will contain the wash coat paint material in a well dispersed state whereas the treatment solution 46 will be a clearer aqueous solution in which the precipitated organic portions of the wash coat paint material will settle out upon standing. The processes described herein are quite efficient in the separation of the organic compounds found in the wash coat paint from the wash solution. The processes can achieve separation efficiencies of at least 75, preferably at least 90, and in some cases at least 95, percent by weight. This percentage can be determined by analyzing the weight difference of the residual solids content between the wash coat solution 22 and the supernate of the treatment solution 46. The separation technique for obtaining the supernate of the treatment solution can be gravity separation.

The pH of the treatment solution 46 is preferably raised prior to further processing to avoid any corrosive wear effects on downstream equipment. In one embodiment, the treatment solution 46 is transferred from the treatment area 41 to a neutralizing area 81 where the treatment solution 46 is contacted with a basic solution, typically a sodium hydroxide solution, to form a neutralized solution 83. The pH of the neutralized solution 83 is typically raised to at least about 5.5, preferably at least 6. The basic solution is stored in tank 80 and transferred to the neutralizing area 81 by means of pump 82. The pH of the neutralized solution 83, stirred by agitator 84, is monitored by pH probe 86.

The neutralized solution 83 is then transported via line 60 to a separation means, such as the filter 62, as shown in FIG. 3. Conventional separation techniques, such as vacuum filters, filter presses, etc., can be employed to separate the precipitated paint material from the aqueous suspension. Although not thought to be as efficient, the separation could also be affected by gravity settling techniques. The filtered solution can be transported via line 64 for disposal, such as to the municipal waste system, while the separated solids can be sent via line 66 to a disposal location such as a landfill.

Although the details of the invention have been set forth with respect to the application of a wash coat to metal cans, the principals of the purification of an aqueous-based waste stream containing a minor amount of a water-reducible paint material are applicable to various other industrial applications.

EXAMPLE

The efficiency of the inventive process was demonstrated in a lab facility. A typical wash coat paint composition, Glidden's 640-C653 paint, was diluted with water such that a final solution of 500 ml was achieved having a 1% wt. wash coat paint concentration.

Concentrated (98% wt.) sulfuric acid was added to the diluted solution in a drop-wise fashion. The pH of the solution was constantly monitored. It was found that precipitation began at about 4.7 and a complete precipitation was achieved at a pH of about 4.3.

The precipitated solution was then successfully filtered through an 8 μm filter media.

What is claimed is:

1. A method for purifying a wash coat waste water stream that is produced from the wash coating of metal cans, consisting essentially of the steps of:
   (a) contacting a plurality of metal cans with a wash coat composition comprising a water reducible paint composition containing paint compounds;
   (b) contacting a portion of the wash coated metal cans with an aqueous wash solution, whereby a portion of the wash coat is removed from the metal can in the wash solution, the wash solution having a water content of at least 95 percent by weight;
   (c) adding sulfuric acid with the wash solution to reduce the pH of the wash solution to below about 5.5 and to form a suspension comprising water and precipitated paint compounds; and
   (d) separating a portion of the precipitated paint compounds from the water in the suspension.

2. The method of claim 1 wherein the water content of the aqueous wash solution is at least about 98 percent by weight.

3. The method of claim 1 wherein the water content of the aqueous wash solution is at least about 99 percent by weight.

4. The method of claim 2 wherein the sulfuric acid is admixed to the aqueous wash solution in an amount sufficient to reduce the pH of the suspension to below about 5.

5. The method of claim 4 further comprising periodically monitoring the pH of the suspension.

6. The method of claim 5 further comprising adjusting the flow rate of the aqueous wash solution in response to the monitoring of the pH of the suspension.

7. The method of claim 5 further comprising adjusting the flow rate of the sulfuric acid in response to the monitoring of the pH of the suspension.

8. The method of claim 5 further comprising adding water to the aqueous wash solution in response to the monitoring of the pH of the suspension.

9. The method of claim 2 wherein the sulfuric acid is admixed to the aqueous wash solution in an amount sufficient to reduce the pH of the suspension to below 4.5.

10. The method of claim 4 wherein the solids contents of the wash solution is reduced by at least 90 percent by weight in the suspension.

11. A method for purifying a wash coat waste water stream that is produced from the wash coating of metal cans, consisting essentially of the step of:
   (a) contacting a plurality of metal cans with a wash coat composition comprising a water reducible paint composition containing paint compounds;
   (b) contacting a portion of the wash coated metal cans with an aqueous wash solution within a rim dip tank, whereby a portion of the wash coat is removed from the metal can into the wash solution, the wash solution having a water content of at least 95 percent by weight;
   (c) transferring at least a portion of the aqueous wash solution from the rim dip tank to a treatment tank to form a part of a treatment tank composition;
   (d) adding sulfuric acid into the aqueous wash solution within the treatment tank to reduce the pH of the treatment tank composition to below about 5.5 and to form a suspension comprising water and precipitated paint compounds; and (e) separating a portion of the precipitated paint compounds from the water in the suspension.

12. The method of claim 11 wherein the water content of the aqueous wash solution in the rim dip tank is at least about 98 percent by weight.

13. The method of claim 11 wherein the water content of the aqueous wash solution in the rim dip tank is at least about 99 percent by weight.

14. The method of claim 11 wherein the sulfuric acid is added into the treatment tank in an amount sufficient to reduce the pH of the treatment tank composition to below about 5.

15. The method of claim 11 further comprising periodically monitoring the pH of the treatment tank composition.

16. The method of claim 15 further comprising adjusting the flow rate of the aqueous wash solution into the treatment tank in response to the monitoring of the pH of the treatment tank composition.

17. The method of claim 15 further comprising adjusting the flow rate of the sulfuric acid into the treatment tank in response to the monitoring of the pH of the treatment tank composition.

18. The method of claim 15 further comprising adding water to the treatment tank composition in response to the monitoring of the pH of the treatment tank composition.

19. The method of claim 11 wherein the sulfuric acid is added into the treatment tank in an amount sufficient to reduce the pH of the treatment tank composition to below 4.5.

20. The method of claim 11 wherein the solids content of the wash solution is reduced by at least 90 percent by weight during the treatment process.

* * * * *

UNITED STATES PATENT AND TRADEMARK OFFICE
CERTIFICATE OF CORRECTION

PATENT NO. : 5,554,296
DATED : September 10, 1996
INVENTOR(S) : Nashat Zakhary

It is certified that error appears in the above-indentified patent and that said Letters Patent is hereby corrected as shown below:

Col. 3, Line 13 delete "in an water" and insert --in a water-- therefor.

Col. 3, Line 18, delete "to nuetralize the" and insert --to neutralize the-- therefor.

Col. 3, Line 21, delete "in their entirities" and insert --in their entireties-- therefor.

Col. 6, Line 50, delete "consisting essentially of the step of" and insert --consisting essentially of the steps of-- therefor.

Signed and Sealed this

Twenty-fourth Day of December, 1996

Attest:

BRUCE LEHMAN

*Attesting Officer*  *Commissioner of Patents and Trademarks*